US012385403B2

United States Patent
Hatta et al.

(10) Patent No.: US 12,385,403 B2
(45) Date of Patent: Aug. 12, 2025

(54) TURBINE STATOR VANE

(71) Applicant: MITSUBISHI HEAVY INDUSTRIES, LTD., Tokyo (JP)

(72) Inventors: Masayoshi Hatta, Tokyo (JP); Kazuki Morimoto, Tokyo (JP); Susumu Wakazono, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/702,088

(22) PCT Filed: Nov. 18, 2022

(86) PCT No.: PCT/JP2022/042830
§ 371 (c)(1),
(2) Date: Apr. 17, 2024

(87) PCT Pub. No.: WO2023/095721
PCT Pub. Date: Jun. 1, 2023

(65) Prior Publication Data
US 2025/0012193 A1 Jan. 9, 2025

(30) Foreign Application Priority Data
Nov. 29, 2021 (JP) .................................. 2021-193277

(51) Int. Cl.
*F01D 5/18* (2006.01)
*F01D 9/02* (2006.01)

(52) U.S. Cl.
CPC ................. *F01D 5/18* (2013.01); *F01D 9/02* (2013.01); *F05D 2260/201* (2013.01); *F05D 2300/611* (2013.01)

(58) Field of Classification Search
CPC ............ F01D 5/18; F01D 5/187; F01D 5/288; F01D 9/02; F01D 9/04; F01D 9/041; F05D 2240/81; F05D 2300/611
See application file for complete search history.

(56) References Cited

U.S. PATENT DOCUMENTS

| 3,628,880 | A | * | 12/1971 | Smuland | ................... | F01D 9/04 |
| | | | | | | 415/115 |
| 4,012,167 | A | | 3/1977 | Noble | | |

(Continued)

FOREIGN PATENT DOCUMENTS

| JP | 2001-254604 | 9/2001 |
| JP | 2004-60638 | 2/2004 |

(Continued)

OTHER PUBLICATIONS

International Search Report issued Dec. 20, 2022 in International Application No. PCT/JP2022/042830, with English-language Translation.

(Continued)

*Primary Examiner* — Courtney D Heinle
*Assistant Examiner* — Cameron A Corday
(74) *Attorney, Agent, or Firm* — Wenderoth, Lind & Ponack, L.L.P.

(57) ABSTRACT

A turbine stator vane according to at least one embodiment of the present disclosure comprises an airfoil, an inner shroud provided on the inner-peripheral side of the airfoil, and an outer shroud provided on the outer-peripheral side of the airfoil. The inner shroud has a first recess formed in the surface on the side opposite the airfoil across a gas path surface of the inner shroud. The outer shroud has a second recess formed in the surface on the side opposite the airfoil across a gas path surface of the outer shroud, and at least one outer passage that communicates with the second recess and does not communicate with the space inside the airfoil. The (Continued)

number of outer passages is greater than the number of inner passages that communicate with the first recess in the inner shroud and do not communicate with the space inside the airfoil.

13 Claims, 5 Drawing Sheets

(56) References Cited

U.S. PATENT DOCUMENTS

| | | | | |
|---|---|---|---|---|
| 6,095,755 | A * | 8/2000 | Houston | C23C 4/01 |
| | | | | 416/224 |
| 6,126,400 | A * | 10/2000 | Nichols | F01D 5/288 |
| | | | | 415/177 |
| 10,544,685 | B2 | 1/2020 | Takamura et al. | |
| 2004/0018082 | A1 * | 1/2004 | Soechting | F01D 9/041 |
| | | | | 415/115 |
| 2007/0148003 | A1 * | 6/2007 | Trishkin | F01D 5/18 |
| | | | | 416/241 R |
| 2009/0074570 | A1 * | 3/2009 | Milleville | F01D 5/288 |
| | | | | 427/256 |
| 2015/0030461 | A1 * | 1/2015 | Mugglestone | F01D 9/065 |
| | | | | 415/115 |
| 2015/0285086 | A1 | 10/2015 | Bangerter | |
| 2015/0322804 | A1 * | 11/2015 | Butler | F01D 9/041 |
| | | | | 29/889.71 |
| 2015/0322818 | A1 * | 11/2015 | Hannam | C23C 14/22 |
| | | | | 415/177 |
| 2015/0345307 | A1 * | 12/2015 | Davidson | F01D 5/3007 |
| | | | | 416/189 |
| 2018/0202301 | A1 | 7/2018 | Otomo et al. | |
| 2019/0032499 | A1 * | 1/2019 | Matsuo | F01D 25/12 |
| 2022/0186623 | A1 | 6/2022 | Koyabu et al. | |

FOREIGN PATENT DOCUMENTS

| | | |
|---|---|---|
| JP | 2015-507128 | 3/2015 |
| JP | 2017-36710 | 2/2017 |
| JP | 2017-160892 | 9/2017 |
| JP | 6344869 | 6/2018 |
| WO | 2020/213381 | 10/2020 |

OTHER PUBLICATIONS

Translation of the International Preliminary Report on Patentability issued Jun. 13, 2024 in International Application No. PCT/JP2022/042830.

* cited by examiner

TURBINE STATOR VANE

TECHNICAL FIELD

The present disclosure relates to a turbine stator vane.

The present application claims priority based on Japanese Patent Application No. 2021-193277 filed in Japan on Nov. 29, 2021, the contents of which are incorporated herein by reference.

BACKGROUND ART

For example, a turbine stator vane used in a gas turbine or the like is exposed to a high-temperature fluid such as combustion gas, and thus has a structure for cooling. For example, in a turbine stator vane described in PTL 1, a stator vane body (airfoil portion), an inner shroud, and an outer shroud are respectively cooled with cooling air (refer to PTL 1).

CITATION LIST

Patent Literature

[PTL 1] International Publication No. WO2020/213381

SUMMARY OF INVENTION

Technical Problem

When the temperature of the combustion gas in the actual machine was measured, it was found that the temperature of the combustion gas on the hub side was lower than a predetermined assumption, and it was found that the metal temperature of the inner shroud was also lower than the predetermined assumption. In a case where the metal temperature of the turbine stator vane is lower than the temperature assumed in advance, the efficiency of the gas turbine is reduced. Therefore, it is desirable that the metal temperature of the turbine stator vane is a temperature close to the temperature assumed in advance.

At least one embodiment of the present disclosure is made in view of the above circumstances, and an object thereof is to optimize the cooling of a turbine stator vane to improve the turbine efficiency.

Solution to Problem (1) According to at least one embodiment of the present disclosure, there is provided a turbine stator vane including:
an airfoil portion;
an inner shroud that is provided on an inner peripheral side of the airfoil portion; and
an outer shroud that is provided on an outer peripheral side of the airfoil portion,
wherein the inner shroud includes a first recessed portion that is formed on a surface on a side opposite to the airfoil portion by interposing a gas path surface of the inner shroud,
the outer shroud includes a second recessed portion that is formed on a surface on a side opposite to the airfoil portion by interposing a gas path surface of the outer shroud, and at least one outer passage communicating with the second recessed portion and not communicating with a space inside the airfoil portion, and
the number of the outer passages is greater than the number of inner passages communicating with the first recessed portion in the inner shroud and not communicating with the space inside the airfoil portion.

Advantageous Effects of Invention

According to at least one embodiment of the present disclosure, it is possible to optimize the cooling of the turbine stator vane and improve the turbine efficiency.

DESCRIPTION OF EMBODIMENTS

Hereinafter, some embodiments of the present disclosure will be described with reference to the accompanying drawings. Dimensions, materials, shapes, relative arrangements, and the like of components described as embodiments or illustrated in the drawings are not intended to limit the scope of the present disclosure, but are merely explanatory examples.

For example, an expression representing a relative or absolute arrangement such as "in a certain direction", "along a certain direction", "parallel", "orthogonal", "center", "concentric", or "coaxial" does not strictly represent only such an arrangement, but also a tolerance or a state of being relatively displaced with an angle or a distance to the extent that the same function can be obtained.

For example, expressions such as "identical", "equal", and "homogeneous" indicating that things are in an equal state does not strictly represent only the equal state, but also a tolerance or a state where there is a difference to the extent that the same function can be obtained.

For example, an expression representing a shape such as a quadrangular shape or a cylindrical shape does not represent only a shape such as a quadrangular shape or a cylindrical shape in a geometrically strict sense, but also a shape including an uneven portion, a chamfered portion, and the like within a range in which the same effect can be obtained.

Meanwhile, the expressions "being provided with", "being prepared with", "comprising", "including", or "having" one component are not exclusive expressions excluding the presence of other components.

Figure 1:
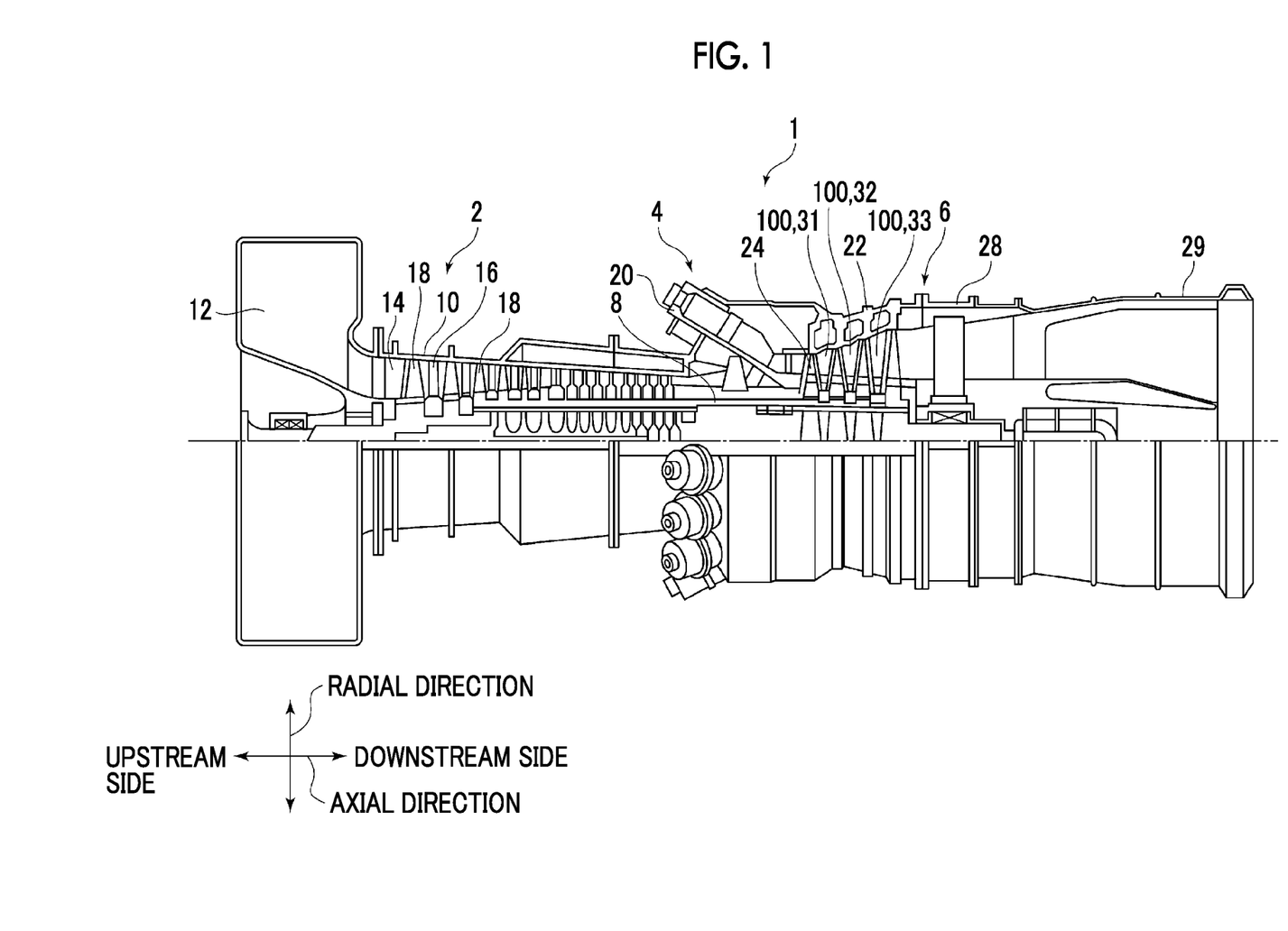
FIG. 1 is a schematic configuration diagram showing a gas turbine 1 according to one embodiment in which turbine stator vanes according to some embodiments are used.

FIG. 1 is a schematic configuration diagram showing a gas turbine 1 according to one embodiment in which turbine stator vanes according to some embodiments are used.

As shown in FIG. 1, the gas turbine 1 according to one embodiment includes a compressor 2 for generating compressed air, a combustor 4 for generating combustion gas using compressed air and fuel, and a turbine 6 configured to be rotationally driven by the combustion gas. In a case of the gas turbine 1 for power generation, a generator (not illustrated) is connected to the turbine 6, and power generation is performed by rotational energy of the turbine 6.

Specific configuration examples of each part in the gas turbine 1 will be described with reference to FIG. 1.

The compressor 2 includes a compressor casing 10, an air intake port 12 provided on an inlet side of the compressor casing 10 to take in air, a rotor shaft 8 provided to penetrate both the compressor casing 10 and a turbine casing 22 to be described later, and various vanes disposed in the compressor casing 10. The various vanes include an inlet guide vane 14 provided on the air intake port 12 side, a plurality of compressor stator vanes 16 fixed to the compressor casing 10 side, and a plurality of compressor rotor vanes 18 embedded in the rotor shaft 8 to be alternately arranged in an axial direction with respect to the compressor stator vanes 16. The compressor 2 may include other constituent elements such as a bleed air chamber (not illustrated). Such a compressor 2 causes the air taken in from the air intake port 12 to pass through the plurality of compressor stator vanes 16 and the plurality of compressor rotor vanes 18 and compresses the air to generate compressed air. Then, the compressed air is sent from the compressor 2 to the combustor 4 on the downstream side.

The combustor 4 is disposed in a casing (combustor casing) 20. As shown in FIG. 1, a plurality of combustors 4 may be disposed in an annular shape around the rotor shaft 8 in the casing 20. The combustor 4 is supplied with the fuel and compressed air generated by the compressor 2, and combusts the fuel to generate a high-temperature and high-pressure combustion gas G which is a working fluid of the turbine 6. Then, the combustion gas is sent from the combustor 4 to the turbine 6 in a rear stage.

The turbine 6 includes the turbine casing 22 and the various turbine vanes disposed in the turbine casing 22. The various turbine vanes include a plurality of turbine stator vanes 100 fixed to the turbine casing 22 side, and a plurality of turbine rotor vanes 24 planted in the rotor shaft 8 to be alternately arranged in the axial direction with respect to the turbine stator vanes 100.

In the turbine 6, the rotor shaft 8 extends in the axial direction (right-left direction in FIG. 1), and the combustion gas flows from the combustor 4 side to the exhaust casing 28 side (from the left side to the right side in FIG. 1). Therefore, in FIG. 1, the left side shown in the drawing is an axial upstream side, and the right side illustrated in the drawing is an axial downstream side. In addition, in the following description, in a case where a radial direction is simply described, it represents the same direction as a radial direction orthogonal to the rotor shaft 8.

In the gas turbine 1 according to the embodiment, the turbine stator vanes 100 include first-stage stator vanes 31, second-stage stator vanes 32, and third-stage stator vanes 33 provided in order from the axial upstream side.

The turbine rotor vane 24 is configured to generate a rotational driving force from the high-temperature and high-pressure combustion gas flowing in the turbine casing 22 together with the turbine stator vane 100. The rotational driving force is transmitted to the rotor shaft 8, so that the generator connected to the rotor shaft 8 is driven.

An exhaust chamber 29 is connected to the turbine casing 22 on the axial downstream side through the exhaust casing 28. The combustion gas after driving of the turbine 6 is discharged to the outside through the exhaust casing 28 and the exhaust chamber 29.

Figure 2:
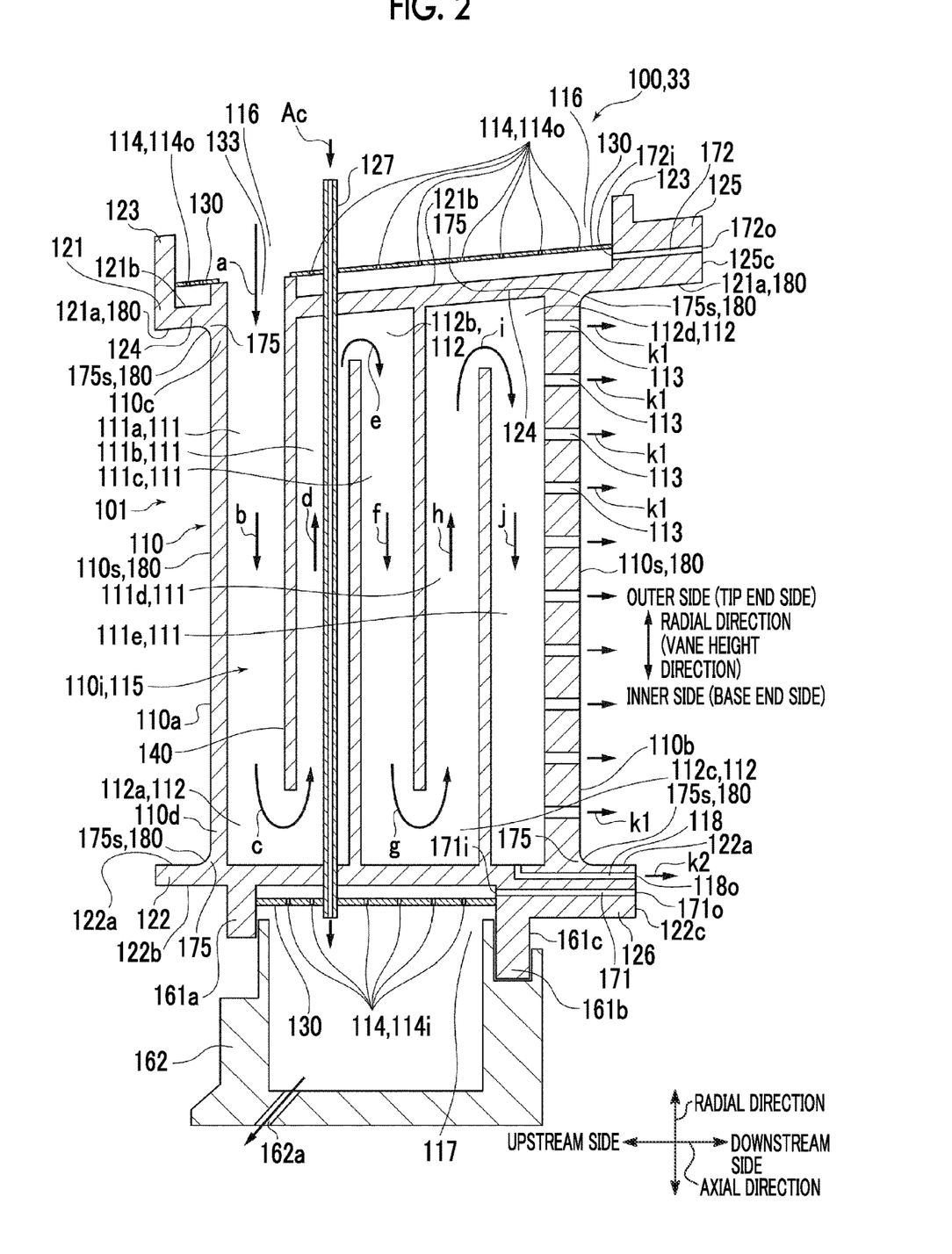
FIG. 2 is a schematic internal sectional view of the turbine stator vane according to the embodiment.

FIG. 2 is a schematic internal sectional view of the turbine stator vane 100 of the embodiment, and shows a cross section along a camber line of an airfoil portion.

Figure 3:
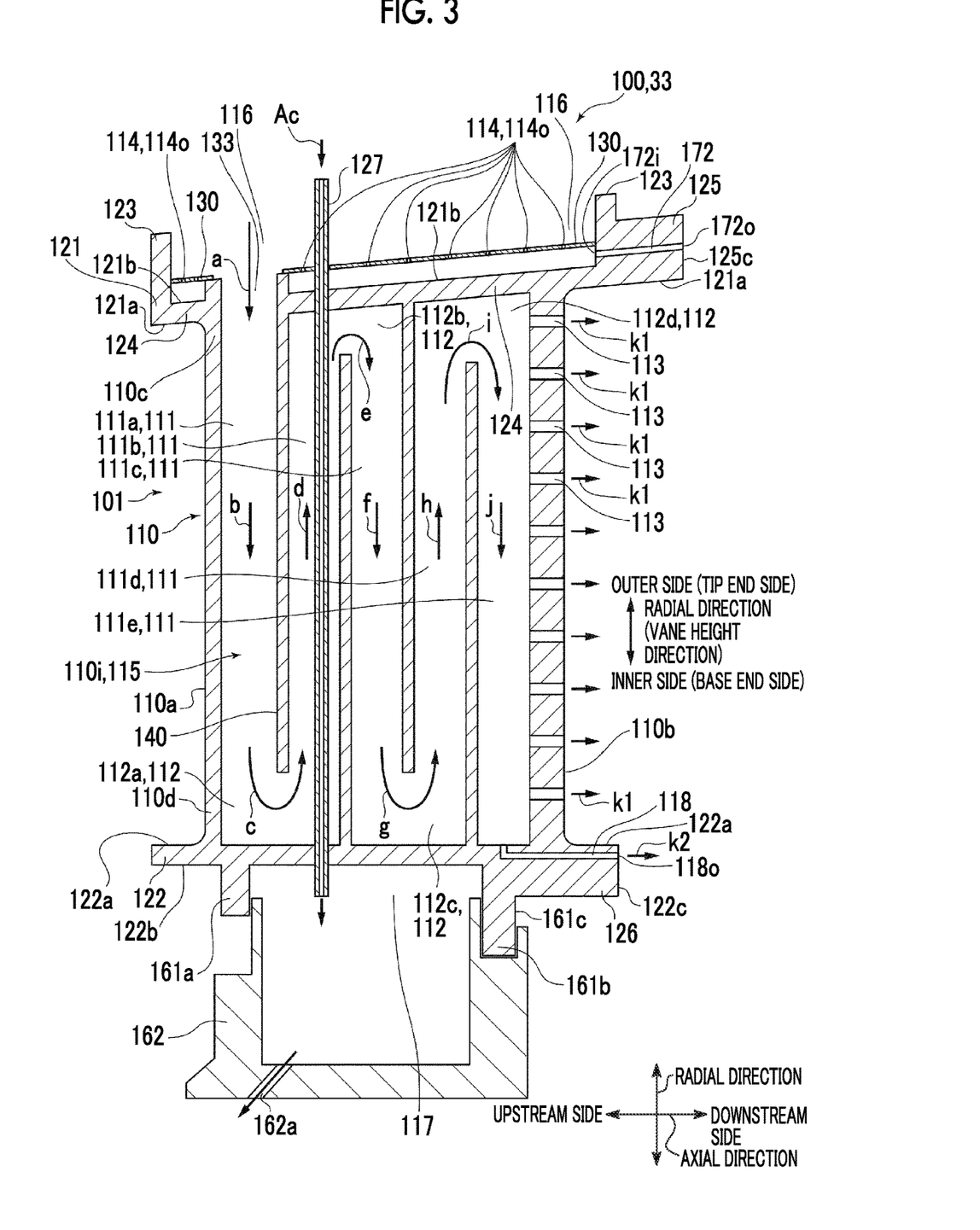
FIG. 3 is a schematic internal sectional view of a turbine stator vane according to another embodiment.

FIG. 3 is a schematic internal sectional view of the turbine stator vane 100 of another embodiment, and shows a cross section along the camber line of the airfoil portion.

Figure 4:
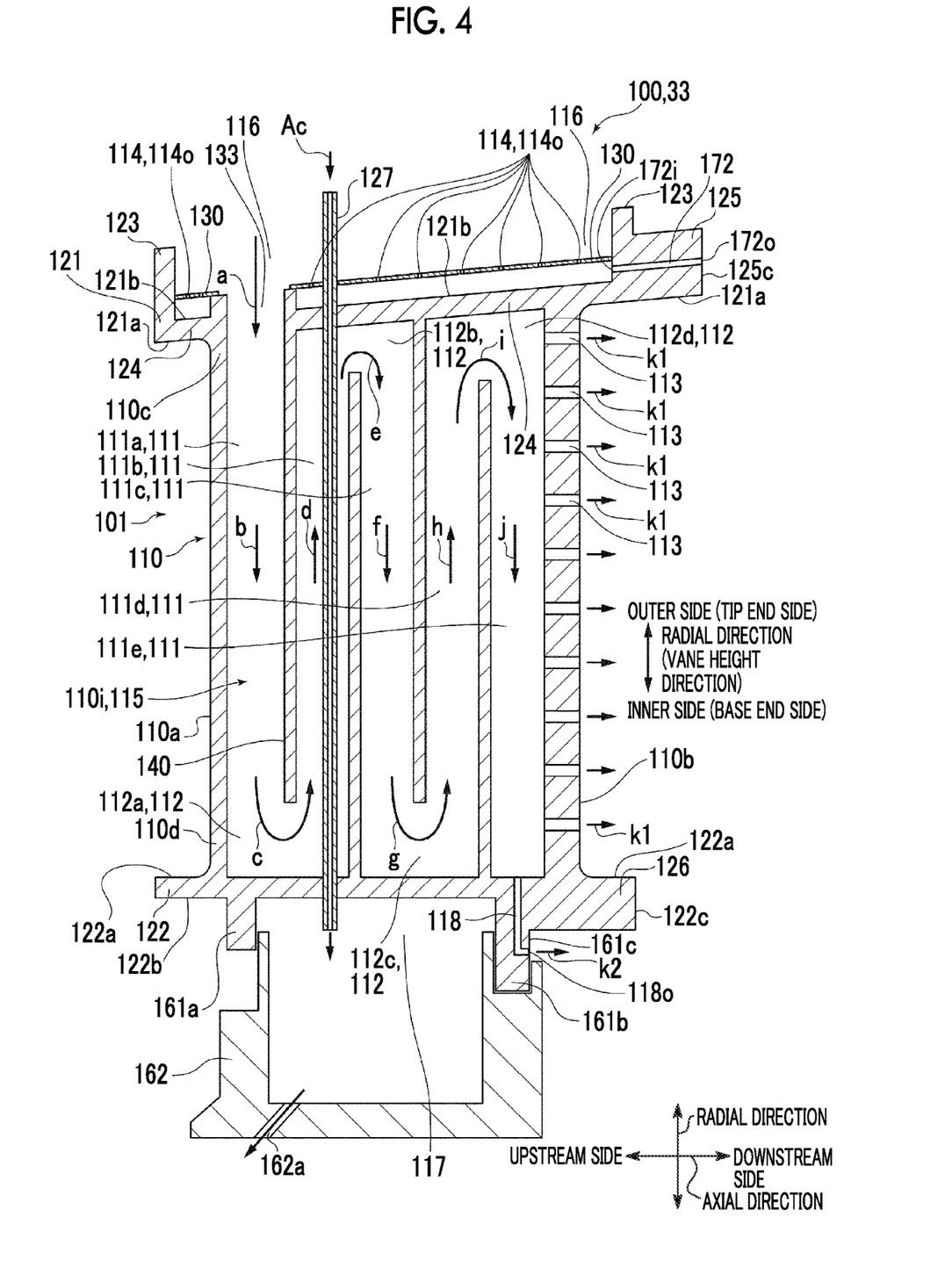
FIG. 4 is a schematic internal sectional view of a turbine stator vane according to still another embodiment.

FIG. 4 is a schematic internal sectional view of the turbine stator vane 100 of still another embodiment, and shows a cross section along the camber line of the airfoil portion.

Hereinafter, the structure of the turbine stator vane 100 according to some embodiments will be described. In the following description, the structure of the third-stage stator vane 33 will be described. However, the first-stage stator vane 31 or the second-stage stator vane 32 may have the same structure as the third-stage stator vane 33. In addition, in a case where the gas turbine 1 according to the embodiment has the turbine stator vane 100 on the axial downstream side of the third-stage stator vane 33, the turbine stator vane 100 may have the same structure as the third-stage stator vane 33.

As shown in FIGS. 2 to 4, the turbine stator vane 100 according to some embodiments includes a vane body 101, an impingement plate 130, and an air pipe 127.

The vane body 101 according to some embodiments includes an airfoil portion 110 having a plurality of cooling channels 111 separated by partition walls 140, an outer shroud 121 provided on a tip end 110c side of the airfoil portion 110, that is, on a radial outer side, and an inner shroud 122 provided on a base end 110d side (base end side) of the airfoil portion 110, that is, on a radial inner side. In the following description, the radial direction is referred to as a vane height direction of the airfoil portion 110 or simply as a vane height direction. In addition, for convenience of description, the plurality of cooling channels 111 will be referred to as a first cooling channel 111a, a second cooling channel 111b, a third cooling channel 111c, a fourth cooling channel 111d, and a fifth cooling channel 111e in order from a leading edge 110a side to a trailing edge 110b side of the airfoil portion 110. However, in the following description, in a case where there is no need to distinguish the cooling channels 111a, 111b, 111c, 111d, and 111e from each other, the description of the alphabet after the number in the reference numeral may be omitted, and the cooling channels may be simply referred to as a cooling channel 111.

In the turbine stator vane 100 according to some embodiments, the first cooling channel 111a and the second cooling channel 111b are separated from each other by the partition wall 140, and the second cooling channel 111b and the third cooling channel 111c are separated from each other by the partition wall 140. The third cooling channel 111c and the fourth cooling channel 111d are separated from each other by the partition wall 140, and the fourth cooling channel 111d and the fifth cooling channel 111e are separated from each other by the partition wall 140.

In the turbine stator vane 100 according to some embodiments, a gas path surface is a surface with which the combustion gas comes into contact in a case where the turbine stator vane 100 according to some embodiments is disposed in the turbine, and corresponds to outer surfaces 121a and 122a of the outer shroud 121 and the inner shroud 122 shown in FIGS. 2 to 4. In the turbine stator vane 100 according to some embodiments, the airfoil portion 110 and the shrouds 121 and 122 are manufactured by, for example, casting.

For example, in the turbine stator vane 100 according to some embodiments shown in FIGS. 2 to 4, four turning channels 112 are formed. Specifically, in order from a leading edge 110a side, a first turning channel 112a communicates with the first cooling channel 111a and the second cooling channel 111b, and a second turning channel 112b communicates with the second cooling channel 111b and the third cooling channel 111c. A third turning channel 112c communicates with the third cooling channel 111c and the fourth cooling channel 111d, and a fourth turning channel 112d communicates with the fourth cooling channel 111d and the fifth cooling channel 111e.

In the turbine stator vane 100 according to some embodiments shown in FIGS. 2 to 4, a plurality of cooling holes 113 are formed in the vicinity of the trailing edge 110b of the airfoil portion 110, the cooling holes 113 communicate with the fifth cooling channel 111e on the upstream side in a flow direction of cooling medium, and the downstream side of the cooling holes 113 is open to an end portion of the trailing edge 110b.

In addition, in the turbine stator vane 100 according to some embodiments shown in FIGS. 2 and 3, in the inner shroud 122, at least one outlet passage 118 is formed, which communicates with the fifth cooling channel 111e on the upstream side in the flow direction of the cooling medium and is open on the downstream side to, for example, an end surface 122c of the inner shroud 122 on the trailing edge side.

In the turbine stator vane 100 according to the embodiment shown in FIG. 4, in the inner shroud 122, at least one outlet passage 118 is formed, which communicates with the fifth cooling channel 111e on the upstream side in the flow direction of the cooling medium and is open on the downstream side to, for example, an end surface 161c of a downstream rib 161b on a trailing edge side, which will be described later.

In the turbine stator vane 100 according to some embodiments shown in FIGS. 2 to 4, a serpentine channel 115 including the plurality of cooling channels 111 and the plurality of turning channels 112 is formed.

In the turbine stator vane 100 according to some embodiments shown in FIGS. 2 to 4, the outer shroud 121 is formed with a bottom portion 124 forming the gas path surface and an outer wall portion 123 extending from both ends of the bottom portion 124 in the axial direction and the circumferential direction to a side opposite to the gas path surface in the vane height direction. The impingement plate 130 fixed to the outer wall portion 123 and having a plurality of through-holes 114 (outer impingement hole 114o) is disposed on the outer shroud 121.

The outer shroud 121 is formed with at least one outer passage 172 that communicates with the space between the impingement plate 130 and an inner surface 121b of the outer shroud 121 and the outside (the outside of the airfoil portion 110) of the turbine stator vane 100, of the second recessed portion (that is, the internal space 116 of the outer shroud 121) surrounded by the outer wall portion 123.

In the turbine stator vane 100 according to some embodiments shown in FIGS. 2 to 4, at least one outer passage 172 is formed in a trailing edge side end portion 125 on the axial downstream side with respect to the internal space 116.

In the turbine stator vane 100 according to some embodiments shown in FIGS. 2 to 4, an outlet end 172o of the outer passage 172 is open to, for example, an end surface 125c of the outer shroud 121 on the trailing edge side.

In the turbine stator vane 100 according to some embodiments shown in FIGS. 2 to 4, the inner shroud 122 is formed with the upstream rib 161a that protrudes inward from an inner surface 122b of the inner shroud 122 in the vane height direction and is disposed on the leading edge 110a side and the downstream rib 161b that protrudes inward from the inner surface 122b of the inner shroud 122 in the vane height direction and is disposed on the trailing edge 110b side.

In the turbine stator vane 100 shown in FIG. 2, the impingement plate 130 partitioning the internal space 117 and having the plurality of through-holes 114 (inner impingement hole 114i) is disposed between the upstream rib 161a and the downstream rib 161b. In the turbine stator vane 100 shown in FIGS. 3 and 4, the impingement plate 130 is not disposed.

In the turbine stator vane 100 shown in FIG. 2, the inner shroud 122 is formed with at least one inner passage 171 that communicates with the space between the impingement plate 130 and the inner surface 122b of the inner shroud 122 and the outside (the outside of the airfoil portion 110) of the turbine stator vane 100, of the first recessed portion (that is, the internal space 117 of the inner shroud 122) between the upstream rib 161a and the downstream rib 161b.

Figure 6:
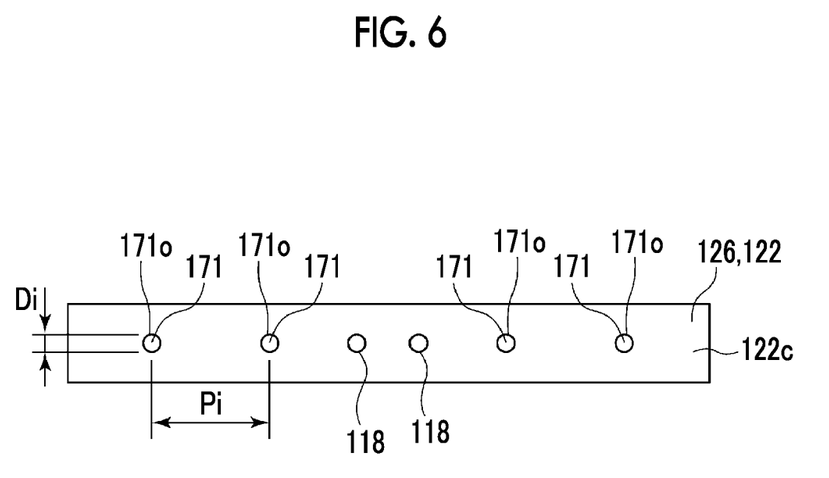
FIG. 6 is a view of an end surface of an inner shroud on a trailing edge side in the turbine stator vane shown in FIG. 2 as seen from a downstream side.

In the turbine stator vane 100 shown in FIG. 2, at least one inner passage 171 is formed in a trailing edge side end portion 126 on the axial downstream side with respect to the internal space 117. In FIG. 2, for convenience of illustration, the inner passage 171 and the outlet passage 118 are illustrated as being shifted in the vane height direction. However, as illustrated in FIG. 6 to be described later, the inner passage 171 and the outlet passage 118 may be formed at the same position in the vane height direction.

In the turbine stator vane 100 shown in FIG. 2, the inner passage 171 does not communicate with a space 110i inside the airfoil portion 110. Here, the fact that the inner passage 171 does not communicate with the space 110i inside the airfoil portion 110 means that the direct connection destination of the inner passage 171 is not the space 110i inside the airfoil portion 110. That is, the fact that the inner passage 171 does not communicate with the space 110i inside the airfoil portion 110 means that all of the end portion openings (an inlet end 171i and an outlet end 171o) of the inner passage 171 do not face the space 110i inside the airfoil portion 110.

In some embodiments, the space 110i inside the airfoil portion 110 is a void formed inside the airfoil portion 110 (a region between the outer surface 121a of the outer shroud 121 and the outer surface 122a of the inner shroud 122), and includes, for example, the serpentine channel 115.

In the turbine stator vane 100 shown in FIGS. 3 and 4, the inner passage 171 is not formed.

The turbine stator vane 100 according to some embodiments shown in FIGS. 2 to 4 includes, for example, the air pipe 127 penetrating the airfoil portion 110 in the vane height direction in the second cooling channel 111b. One end of the air pipe 127 is open to an internal space 117 formed in a holding ring 162 supported by the inner shroud 122. The holding ring 162 is supported by the inner shroud 122 through the upstream rib 161a and the downstream rib 161b of the inner shroud 122.

In addition, the holding ring 162 includes, for example, a circulation hole 162a in the bottom surface.

For example, the cooling medium supplied to the turbine stator vane 100 is the compressed air drawn from the compressor 2.

In the turbine stator vane 100 according to some embodiments shown in FIGS. 2 to 4, the cooling medium supplied to the serpentine channel 115 is supplied from the outside to the internal space 116 of the outer shroud 121 as indicated by an arrow a. The cooling medium flows into the first cooling channel 111a through an opening 133 formed in the outer shroud 121, and as indicated by an arrow b, flows in the first cooling channel 111a from the tip end 110c side toward the base end 110d side along the vane height direction. Thereafter, the cooling medium flowing into the first cooling channel 111a sequentially flows through each turning channel 112 and each cooling channel 111 as indicated by arrows c to j. In this way, the cooling medium flows from the leading edge 110a side toward the trailing edge 110b side in the airfoil portion 110 in the same direction as the main flow of the combustion gas.

The cooling medium flowing into the fifth cooling channel 111e is discharged from a plurality of cooling holes 113 open to the trailing edge 110b to the outside of the airfoil portion 110 in the combustion gas as indicated by an arrow k1.

In addition, the cooling medium flowing into the fifth cooling channel 111e is discharged into the combustion gas outside the airfoil portion 110 through the outlet passage 118 as indicated by an arrow k2.

In addition, in the case of the turbine stator vane 100 according to some embodiments shown in FIGS. 2 to 4, the cooling medium supplied from the outside into a region (internal space 116) on the radial outer side (tip end 110c side) with respect to the impingement plate 130 is blown to the inner surface 121b of the bottom portion 124 of the outer shroud 121 on the radial outer side (tip end 110c side) through the plurality of through-holes 114 of the impingement plate 130 disposed on the outer shroud 121. The cooling medium impingement cools (collision cools) the inner surface 121b. Accordingly, the bottom portion 124 of the outer shroud 121 can be cooled by the cooling medium.

The cooling medium that cools the bottom portion 124 of the outer shroud 121 is discharged from the second recessed portion (internal space 116) into the combustion gas outside the airfoil portion 110 through the plurality of outer passages 172.

The cooling medium Ac supplied from the internal space 116 of the outer shroud 121 is supplied to the internal space 117 formed in the holding ring 162 on the inner shroud 122 side through the air pipe 127.

In the turbine stator vane 100 shown in FIG. 2, a portion of the cooling medium Ac is applied as cooling air for impingement cooling (collision cooling) to the inner surface 122b of the inner shroud 122 through the plurality of through-holes 114 of the impingement plate 130 disposed on the inner shroud 122.

In the turbine stator vane 100 shown in FIG. 2, the remaining cooling medium Ac is supplied from the circulation hole 162a to the inter-stage cavity (not illustrated), and the combustion gas is prevented from flowing back to an inter-stage cavity as a purge air.

In the turbine stator vane 100 shown in FIG. 2, the cooling medium Ac that cools the inner surface 122b of the inner shroud 122 is discharged from the first recessed portion (internal space 117) to the combustion gas outside the airfoil portion 110 through the inner passage 171.

In the turbine stator vane 100 shown in FIGS. 3 and 4, the cooling medium Ac supplied to the internal space 117 is supplied from the circulation hole 162a to the inter-stage cavity (not illustrated), and the combustion s is prevented from flowing back to the inter-stage cavity as the purge air.

As described above, the turbine stator vane 100 according to some embodiments shown in FIGS. 2 to 4 includes the airfoil portion 110, the inner shroud 122 provided on an inner peripheral side of the airfoil portion 110, and the outer shroud 121 provided on an outer peripheral side of the airfoil portion 110.

In the turbine stator vane 100 according to some embodiments shown in FIGS. 2 to 4, the inner shroud 122 has the first recessed portion (internal space 117) formed on a surface on a side opposite to the airfoil portion 110 with the gas path surface (outer surface 122a) of the inner shroud 122 interposed therebetween.

In the turbine stator vane 100 according to some embodiments shown in FIGS. 2 to 4, the outer shroud 121 includes the second recessed portion (internal space 116) formed on a surface on a side opposite to the airfoil portion 110 with the gas path surface (outer surface 121a) interposed therebetween, and at least one outer passage 172 communicating with the second recessed portion (internal space 116) and not communicating with the space 110i inside the airfoil portion 110.

Here, the fact that the outer passage 172 does not communicate with the space 110i inside the airfoil portion 110 means that the direct connection destination of the outer passage 172 is not the space 110i inside the airfoil portion 110. That is, the fact that the outer passage 172 does not communicate with the space 110i inside the airfoil portion 110 means that all of the end portion openings (an inlet end 172i and an outlet end 172o) of the outer passage 172 do not face the space 110i inside the airfoil portion 110.

When the temperature of the combustion gas in the actual machine of the gas turbine 1 was measured by the inventors, it was found that the temperature of the combustion gas on the hub side in the third-stage stator vane 33 was lower than a predetermined assumption, and it was found that the metal temperature of the inner shroud 122 in the third-stage stator vane 33 was also lower than a predetermined assumption. In a case where the metal temperature of the turbine stator vane 100 is lower than the temperature assumed in advance, the efficiency of the gas turbine 1 is reduced. Therefore, it is desirable that the metal temperature of the turbine stator vane 100 is a temperature close to the temperature assumed in advance.

Therefore, in the turbine stator vane 100 of some embodiments, the number of the outer passages 172 is set to be greater than the number of the inner passages 171.

Therefore, cooling capacity of the inner shroud 122 can be suppressed to be lower than cooling capacity of the outer shroud 121, and thus excessive cooling of the inner shroud 122 can be suppressed, and the cooling of the turbine stator vane 100 can be optimized. Accordingly, the turbine efficiency can be improved.

More specifically, in some embodiments, the turbine stator vane 100 may be configured to satisfy any one of the following (A), (B), or (C) conditions.

(A) The inner shroud 122 does not have the inner passage 171.

(B) The inner shroud 122 has one inner passage 171, and the cross-sectional area Si of the outlet end 171o of the one inner passage 171 is smaller than the total ΣSo of the cross-sectional areas So of the outlet ends 172o of the at least one outer passage 172.

(C) The inner shroud 122 has two or more inner passages 171, and a value (Pi/Di) obtained by dividing an interval Pi between the inner passages 171 by the diameter Di of the inner passage 171 is larger than a value (Po/Do) obtained by dividing an interval Po between the outer passages 172 by the diameter Do of the outer passage 172.

The condition (A) will be described.

For example, as shown in FIGS. 3 and 4, the condition (A) is satisfied in a case where the impingement plate 130 is not disposed in the internal space 117, the inner passage 171 is not formed in the turbine stator vane 100, and the inner surface 122b of the inner shroud 122 is not impingement cooled.

In the turbine stator vane 100 shown in FIGS. 3 and 4, the inner surface 122b of the inner shroud 122 is not impingement cooled. Therefore, the cooling capacity of the inner shroud 122 can be suppressed to be lower than the cooling capacity of the outer shroud 121. In this manner, the excessive cooling of the inner shroud 122 can be suppressed, the cooling of the turbine stator vane 100 can be optimized, and the turbine efficiency can be improved.

The condition (B) will be described.

For example, as shown in FIG. 2, the above condition (B) is a condition applied in a case where the impingement plate 130 is disposed in the internal space 117, the inner passage 171 is formed in the turbine stator vane 100, and the inner surface 122b of the inner shroud 122 is impingement coolable.

As in the condition (B), in a case where the inner shroud 122 has one inner passage 171 and the cross-sectional area Si of the outlet end 171o of the one inner passage 171 is smaller than the total $\Sigma$So of the cross-sectional areas So of the outlet ends 172o of the at least one outer passage 172, the flow rate of the cooling medium in the inner passage 171 can be suppressed to be smaller than the total flow rate of the cooling medium in all of the outer passages 172. Accordingly, the cooling capacity of the inner shroud can be suppressed to be lower than the cooling capacity of the outer shroud, and thus excessive cooling of the inner shroud can be suppressed and the cooling of the turbine stator vane can be optimized. Therefore, the turbine efficiency can be improved.

The condition (C) will be described.

For example, as shown in FIG. 2, the above condition (C) is a condition applied in a case where the impingement plate 130 is disposed in the internal space 117, the inner passage 171 is formed in the turbine stator vane 100, and the inner surface 122b of the inner shroud 122 is impingement coolable.

Figure 5:
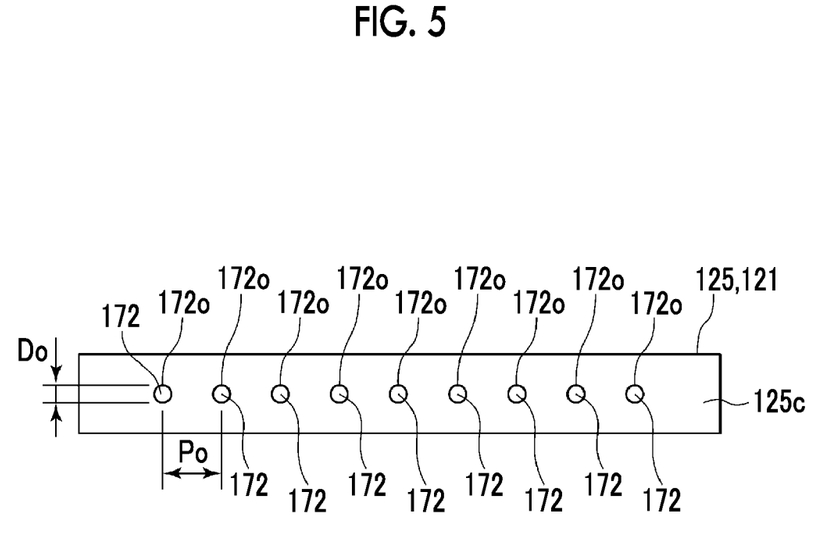
FIG. 5 is a view of an end surface of an outer shroud on a trailing edge side in the turbine stator vane shown in FIGS. 2 to 4 as seen from a downstream side.

FIG. 5 is a view of the end surface 125c of the outer shroud 121 on the trailing edge side in the turbine stator vane 100 shown in FIGS. 2 to 4 as seen from the downstream side.

FIG. 6 is a view of the end surface 122c of the inner shroud 122 on the trailing edge side in the turbine stator vane 100 shown in FIG. 2 as seen from the downstream side.

As in the condition (C), in a case where the inner shroud 122 has two or more inner passages 171 and a value (Pi/Di) obtained by dividing the interval Pi between the inner passages 171 by the diameter Di of the inner passage 171 is larger than a value (Po/Do) obtained by dividing the interval Po between the outer passages 172 by the diameter Do of the outer passage 172, the total amount of the flow rate of the cooling medium in all of the inner passages 171 can be suppressed to be smaller than the total amount of the flow rate of the cooling medium in all of the outer passages 172. Accordingly, the cooling capacity of the inner shroud 122 can be suppressed to be lower than the cooling capacity of the outer shroud 121. Therefore, excessive cooling of the inner shroud 122 can be suppressed, and the cooling of the turbine stator vane 100 can be optimized. Therefore, the turbine efficiency can be improved.

That is, in some embodiments, the turbine stator vane 100 is configured to satisfy any one of the following (A), (B), or (C) conditions, and thus the cooling capacity of the inner shroud 122 can be suppressed to be lower than the cooling capacity of the outer shroud 121. Therefore, excessive cooling of the inner shroud 122 can be suppressed, and the cooling of the turbine stator vane 100 can be optimized. Accordingly, the turbine efficiency can be improved.

In some embodiments, a value ($\Sigma$Si/(Sig+Sit)) obtained by dividing the total value $\Sigma$Si of the cross-sectional area Si of the outlet end 171o of the inner passage 171 by the total value of the area Sig of the gas path surface (outer surface 122a) of the inner shroud 122 and the area Sit of the end surface 122c of the inner shroud 122 on the trailing edge side may be smaller than a value ($\Sigma$So/(Sog+Sot)) obtained by dividing the total value $\Sigma$So of the cross-sectional areas So of the outlet ends 172o of the outer passage 172 by the total value of the area Sog of the gas path surface (outer surface 121a) of the outer shroud 121 and the area Sot of the end surface 125c of the outer shroud 121 on the trailing edge side.

In this case, when the areas (Sig and Sog) of the gas path surfaces (outer surfaces 121a and 122a) and the areas (Sot and Sit) of the end surfaces 125c and 122c of the shrouds 121 and 122 on the trailing edge side are compared per unit area of the total area, the flow rate of the cooling medium flowing through the inner passage 171 is smaller than the flow rate of the cooling medium flowing through the outer passage 172. Accordingly, the cooling capacity of the inner shroud 122 can be suppressed to be lower than the cooling capacity of the outer shroud 121. Therefore, excessive cooling of the inner shroud 122 can be suppressed, and the cooling of the turbine stator vane 100 can be optimized.

In some embodiments, a value ($\Sigma$Si1/Sit) obtained by dividing the total value $\Sigma$Si1 of the cross-sectional area Si1 of the outlet end 171o, which is open to the end surface 122c of the inner shroud 122 on the trailing edge side, of the inner passage 171 by the area Sit of the end surface 122c of the inner shroud 122 on the trailing edge side may be smaller than a value ($\Sigma$So1/Sot) obtained by dividing the total value $\Sigma$So1 of the cross-sectional areas So1 of the outlet ends 172o, which is open to the end surface 125c of the outer shroud 121 on the trailing edge side, of the outer passage 172 by the area Sot of the end surface 125c of the outer shroud 121 on the trailing edge side.

In this case, when the flow rate of the cooling medium flowing through the inner passage 171 is compared with the flow rate of the cooling medium flowing through the outer passage 172 per unit area of the end surfaces 125c and 122c of the shrouds 121 and 122 on the trailing edge side, the flow rate of the cooling medium flowing through the inner passage 171 is smaller than the flow rate of the cooling medium flowing through the outer passage 172. Accordingly, the cooling capacity of the inner shroud 122 can be suppressed to be lower than the cooling capacity of the outer shroud 121. Therefore, excessive cooling of the inner shroud 122 can be suppressed, and the cooling of the turbine stator vane 100 can be optimized.

In some embodiments, an opening density of the inner impingement hole 114i for the impingement cooling of the inner shroud 122 may be smaller than an opening density of the outer impingement hole 114o for the impingement cooling of the outer shroud 121.

Here, the opening density of the inner impingement hole 114i is a value obtained by dividing the total value of the opening areas of the inner impingement holes 114i by the area of the impingement plate 130 disposed on the inner shroud 122.

Similarly, the opening density of the outer impingement hole 114o is a value obtained by dividing the total value of the opening areas of the outer impingement holes 114o by the area of the impingement plate 130 disposed on the outer shroud 121.

Accordingly, the cooling capacity of the inner shroud 122 can be suppressed to be lower than the cooling capacity of the outer shroud 121. Therefore, excessive cooling of the inner shroud 122 can be suppressed, and the cooling of the turbine stator vane 100 can be optimized.

In addition, the expression "the opening density of the inner impingement hole 114*i* for performing impingement cooling on the inner shroud 122 is smaller than the opening density of the outer impingement hole 114*o* for performing impingement cooling on the outer shroud 121" described above also includes a case where the opening density of the inner impingement hole 114*i* for performing impingement cooling on the inner shroud 122 is zero, that is, a case where the impingement plate 130 in which the inner impingement hole 114*i* is formed is not attached as shown in FIG. 3 or FIG. 4.

In this case, the impingement cooling of the inner shroud 122 is not performed, so that the excessive cooling of the inner shroud 122 can be suppressed and the cooling of the turbine stator vane 100 can be optimized.

(Regarding Thermal Barrier Coating)

In the turbine stator vane 100 shown in FIGS. 2 to 4, the thermal barrier coating 180 may be applied to the airfoil portion 110, the gas path surface (outer surface 121*a*) of the outer shroud 121, or the like.

The construction range of the thermal barrier coating 180 in the turbine stator vane 100 shown in FIGS. 2 to 4 is, for example, the surface 110*s* of the airfoil portion 110, the outer surface 121*a* of the outer shroud 121, a surface 175*s* of a fillet portion 175 connecting the surface 110*s* of the airfoil portion 110 and the outer surface 121*a* of the outer shroud 121, and the surface 175*s* of the fillet portion 175 connecting the surface 110*s* of the airfoil portion 110 and the outer surface 122*a* of the inner shroud 122 (refer to FIG. 2).

In a case where there is a margin in the cooling capacity of the inner shroud 122, it is conceivable to suppress the manufacturing cost of the turbine stator vane 100 by narrowing the construction range of the thermal barrier coating 180 having a relatively high construction cost.

That is, when the cooling of the inner shroud 122 by the cooling medium is suppressed as described above, the temperature of the inner shroud 122 becomes a temperature relatively close to the temperature of the combustion gas on the hub side. In such a case, the necessity of lowering the temperature of the inner shroud 122 to a temperature lower than the temperature of the combustion gas on the hub side is reduced by performing the thermal barrier coating 180 on the outer surface 122*a* of the inner shroud 122.

Therefore, in the turbine stator vane 100 shown in FIGS. 2 to 4, the thermal barrier coating 180 is not applied to the outer surface 122*a* of the inner shroud 122. The thermal barrier coating 180 may be applied to a part of the outer surface 122*a* of the inner shroud 122, not to the entire outer surface 122*a*.

Here, the outer surface 122*a* of the inner shroud 122 does not include the surface 175*s* of the fillet portion 175 that connects the surface 110*s* of the airfoil portion 110 and the outer surface 122*a* of the inner shroud 122.

As described above, in some embodiments, a value (Sic/Sig) obtained by dividing the construction area Sic of the thermal barrier coating 180 applied to the gas path surface (the outer surface 122*a*) of the inner shroud 122 by the area Sig of the gas path surface (the outer surface 122*a*) of the inner shroud 122 may be smaller than a value (Soc/Sog) obtained by dividing the construction area Soc of the thermal barrier coating 180 applied to the gas path surface (the outer surface 121*a*) of the outer shroud 121 by the area Sog of the gas path surface (the outer surface 121*a*) of the outer shroud 121.

In addition, the case where the value (Sic/Sig) is smaller than the value (Soc/Sog) includes a case where the construction area Sic of the thermal barrier coating 180 applied to the gas path surface (outer surface 122*a*) of the inner shroud 122 is zero.

That is, as described above, the inner shroud 122 may not be provided with the thermal barrier coating 180 on the gas path surface (outer surface 122*a*) of the inner shroud 122.

In this way, the manufacturing cost of the turbine stator vane 100 can be suppressed by narrowing the construction range of the thermal barrier coating on the gas path surface (outer surface 122*a*) of the inner shroud 122.

In the turbine stator vane 100 shown in FIGS. 2 to 4, the inner shroud 122 may have the outlet passage 118 communicating with the space 110*i* inside the airfoil portion 110 and not communicating with the first recessed portion (internal space 117).

Accordingly, in a case where the cooling medium is supplied to the serpentine channel 115 which is the space 110*i* inside the airfoil portion 110, the cooling medium can be discharged to the outside of the turbine stator vane 100 through the outlet passage 118.

In addition, the space 110*i* inside the airfoil portion 110 described above may be a channel of a cooling medium formed inside the airfoil portion 110 other than the serpentine channel 115.

In some embodiments, the turbine stator vane 100 shown in FIGS. 2 to 4 may be the above-described turbine third-stage stator vane (third-stage stator vane 33).

Accordingly, as described above, in a case where the combustion gas temperature on the hub side of the third-stage stator vane 33 is lower than the predetermined assumption and the metal temperature of the inner shroud 122 of the third-stage stator vane 33 is also lower than the predetermined assumption, the excessive cooling of the inner shroud 122 can be suppressed, and the cooling of the turbine stator vane 100 (third-stage stator vane 33) can be optimized.

The present disclosure is not limited to the above-described embodiments, and includes a modification of the above-described embodiments and an appropriate combination of the embodiments.

For example, in some of the above-described embodiments, the outlet end 171*o* of the inner passage 171 is formed on the end surface 122*c* of the inner shroud 122 on the trailing edge side. However, at least a part of the outlet end 171*o* may be formed on the outer surface 122*a* of the inner shroud 122.

For example, in some of the above-described embodiments, the outlet end 172*o* of the outer passage 172 is formed on the end surface 125*c* of the outer shroud 121 on the trailing edge side. However, at least a part of the outlet end 172*o* may be formed on the outer surface 121*a* of the outer shroud 121.

For example, in some of the above-described embodiments, the outlet end 118*o* of the outlet passage 118 is formed on the end surface 122*c* of the inner shroud 122 on the trailing edge side or on the end surface 161*c* of the downstream rib 161*b* on the trailing edge side. However, at least a part of the outlet end 118*o* may be formed on the outer surface 122*a* of the inner shroud 122.

For example, the contents described in each embodiment are understood as follows.

(1) A turbine stator vane 100 according to at least one embodiment of the present disclosure includes an airfoil portion 110, an inner shroud 122 that is provided on an inner peripheral side of the airfoil portion 110, and an outer shroud 121 that is provided on an outer peripheral side of the airfoil portion 110. The inner shroud 122 includes a first recessed portion (internal space 117) that is formed on a surface on a side opposite to the airfoil portion 110 by interposing a gas path surface (outer surface 122a) of the inner shroud 122. The outer shroud 121 includes a second recessed portion (internal space 116) that is formed on a surface on a side opposite to the airfoil portion 110 by interposing a gas path surface (outer surface 121a) of the outer shroud 121, and at least one outer passage 172 communicating with the second recessed portion (internal space 116) and not communicating with a space 110i (for example, a serpentine channel 115) inside the airfoil portion 110. The number of the outer passages 172 is greater than the number of inner passages 171 communicating with the first recessed portion (internal space 117) in the inner shroud 122 and not communicating with the space 110i (for example, the serpentine channel 115) inside the airfoil portion 110.

According to the configuration of (1) above, the cooling capacity of the inner shroud 122 can be suppressed to be lower than the cooling capacity of the outer shroud 121. Therefore, excessive cooling of the inner shroud 122 can be suppressed, and the cooling of the turbine stator vane 100 can be optimized. Accordingly, the turbine efficiency can be improved.

(2) In some embodiments, in the configuration of (1) above, any one of the following conditions (A), (B), or (C) may be satisfied.
  (A) The inner shroud 122 does not have the inner passage 171.
  (B) The inner shroud 122 has one inner passage 171, and the cross-sectional area Si of the outlet end 171o of the one inner passage 171 is smaller than the total $\Sigma$So of the cross-sectional areas So of the outlet ends 172o of the at least one outer passage 172.
  (C) The inner shroud 122 has two or more inner passages 171, and a value (Pi/Di) obtained by dividing an interval Pi between the inner passages 171 by the diameter Di of the inner passage 171 is larger than a value (Po/Do) obtained by dividing an interval Po between the outer passages 172 by the diameter Do of the outer passage 172.

According to the configuration of (2) above, the cooling capacity of the inner shroud 122 can be suppressed to be lower than the cooling capacity of the outer shroud 121 in a case where any one of the conditions (A), (B), and (C) is satisfied. Therefore, excessive cooling of the inner shroud 122 can be suppressed, and the cooling of the turbine stator vane 100 can be optimized. Accordingly, the turbine efficiency can be improved.

(3) In some embodiments, in the configuration of (2) above, a value ($\Sigma$Si/(Sig+Sit)) obtained by dividing a total value $\Sigma$Si of the cross-sectional areas Si of the outlet ends 171o of the inner passages 171 by a total value of an area Sig of the gas path surface (outer surface 122a) of the inner shroud 122 and an area Sit of an end surface 122c of the inner shroud 122 on a trailing edge side may be smaller than a value ($\Sigma$So/(Sog+Sot)) obtained by dividing a total value $\Sigma$So of the cross-sectional areas So of the outlet ends 172o of the outer passages 172 by a total value of an area Sog of the gas path surface (outer surface 121a) of the outer shroud 121 and an area Sot of an end surface 125c of the outer shroud 121 on a trailing edge side.

According to the configuration of (3) above, when the areas (Sog and Sig) of the gas path surfaces (outer surfaces 121a and 122a) and the areas (Sot and Sit) of the end surfaces 125c and 122c of the shrouds 121 and 122 on the trailing edge side are compared per unit area of the total area, the flow rate of the cooling medium flowing through the inner passage 171 is smaller than the flow rate of the cooling medium flowing through the outer passage 172. Accordingly, the cooling capacity of the inner shroud 122 can be suppressed to be lower than the cooling capacity of the outer shroud 121. Therefore, excessive cooling of the inner shroud 122 can be suppressed, and the cooling of the turbine stator vane 100 can be optimized.

(4) In some embodiments, in the configuration of (2) or (3) above, a value ($\Sigma$Si1/Sit) obtained by dividing a total value Si1 of cross-sectional areas Si1 of the outlet ends 171o of the inner passage 171, which are open to an end surface 122c of the inner shroud 122 on a trailing edge side, of the inner passage 171 by an area Sit of the end surface 122c of the inner shroud 122 on the trailing edge side may be smaller than a value ($\Sigma$Sol/Sot) obtained by dividing a total value $\Sigma$Sol of cross-sectional areas Sol of the outlet ends 172o of the outer passage 172, which are open to an end surface 125c of the outer shroud 121 on a trailing edge side, of the outer passage 172 by an area Sot of the end surface 125c of the outer shroud 121 on the trailing edge side.

According to the configuration of (4) above, when the flow rate of the cooling medium flowing through the inner passage 171 is compared with the flow rate of the cooling medium flowing through the outer passage 172 per unit area of the end surfaces 125c and 122c of the shrouds 121 and 122 on the trailing edge side, the flow rate of the cooling medium flowing through the inner passage 171 is smaller than the flow rate of the cooling medium flowing through the outer passage 172. Accordingly, the cooling capacity of the inner shroud 122 can be suppressed to be lower than the cooling capacity of the outer shroud 121. Therefore, excessive cooling of the inner shroud 122 can be suppressed, and the cooling of the turbine stator vane 100 can be optimized.

(5) In some embodiments, in any one of the configurations of (1) to (4) above, an opening density of an inner impingement hole 114i for impingement cooling the inner shroud 122 may be smaller than an opening density of an outer impingement hole 114o for impingement cooling the outer shroud 121.

According to the configuration of (5) above, the cooling capacity of the inner shroud 122 can be suppressed to be lower than the cooling capacity of the outer shroud 121. Therefore, excessive cooling of the inner shroud 122 can be suppressed, and the cooling of the turbine stator vane 100 can be optimized.

(6) In some embodiments, in the configuration of (5) above, an impingement plate 130 in which the inner impingement hole 114i is formed is not attached to the inner shroud.

According to the configuration of (6) above, the impingement cooling of the inner shroud 122 is not performed, so that the excessive cooling of the inner shroud 122 can be suppressed and the cooling of the turbine stator vane 100 can be optimized.

(7) In some embodiments, in any one of the configurations of (1) to (6) above, a value (Sic/Sig) obtained by dividing a construction area Sic of a thermal barrier coating 180 that is applied to the gas path surface (outer surface 122a) of the inner shroud 122 by an area Sig of the gas path surface (outer surface 122a) of the inner shroud 122 may be smaller than a value (Soc/Sog) obtained by dividing a construction area Soc of a thermal barrier coating 180 that is applied to the gas path surface (outer surface 121*a*) of the outer shroud 121 by an area Sog of the gas path surface (outer surface 121*a*) of the outer shroud 121.

In a case where there is a margin in the cooling capacity of the inner shroud 122, it is conceivable to suppress the manufacturing cost of the turbine stator vane 100 by narrowing the construction range of the thermal barrier coating with a relatively high construction cost.

According to the configuration of (7) above, the manufacturing cost of the turbine stator vane 100 can be suppressed by narrowing the construction range of the thermal barrier coating 180 on the gas path surface (outer surface 122*a*) of the inner shroud 122.

(8) In some embodiments, in the configuration of (7) above, the thermal barrier coating 180 may not be applied on the gas path surface (outer surface 122*a*) of the inner shroud 122.

In a case where there is a margin in the cooling capacity of the inner shroud, it is conceivable to suppress the manufacturing cost of the turbine stator vane 100 by narrowing the construction range of the thermal barrier coating 180 having a relatively high construction cost.

According to the configuration of (8) above, the manufacturing cost of the turbine stator vane 100 can be suppressed by not applying the thermal barrier coating 180 to the gas path surface (outer surface 122*a*) of the inner shroud 122.

(9) In some embodiments, in any one of the configurations of (1) to (8) above, the inner shroud 122 may include an outlet passage 118 communicating with the space 110*i* (for example, a serpentine channel 115) inside the airfoil portion 110 and not communicating with the first recessed portion (internal space 117).

According to the configuration of (9) above, in a case where the cooling medium is supplied to the space 110*i* (for example, the serpentine channel 115) inside the airfoil portion 110, the cooling medium can be discharged to the outside of the turbine stator vane 100 through the outlet passage 118.

(10) In some embodiments, in the configuration of (9) above, the space 110*i* inside the airfoil portion 110 communicating with the outlet passage 118 may be a serpentine channel 115 for cooling the airfoil portion 110.

According to the configuration of (10) above, the cooling medium supplied to the serpentine channel 115 for cooling the airfoil portion 110 can be discharged to the outside of the turbine stator vane 100 through the outlet passage 118.

(11) A turbine stator vane 100 according to at least one embodiment of the present disclosure includes an airfoil portion 110, an inner shroud 122 that is provided on an inner peripheral side of the airfoil portion 110, and an outer shroud 121 that is provided on an outer peripheral side of the airfoil portion 110. An opening density of an inner impingement hole 114*i* for impingement cooling the inner shroud 122 is smaller than an opening density of an outer impingement hole 114*o* for impingement cooling the outer shroud 121.

According to the configuration of (11) above, the cooling capacity of the inner shroud 122 can be suppressed to be lower than the cooling capacity of the outer shroud 121. Therefore, excessive cooling of the inner shroud 122 can be suppressed, and the cooling of the turbine stator vane 100 can be optimized. Accordingly, the turbine efficiency can be improved.

(12) In some embodiments, in any one of the configurations of (1) to (11) above, the turbine stator vane 100 may be a turbine third-stage stator vane (a third-stage stator vane 33).

According to the configuration of (12) above, in a case where the combustion gas temperature on the hub side of the turbine third-stage stator vane (third-stage stator vane 33) is lower than a predetermined assumption and the metal temperature of the inner shroud 122 of the turbine third-stage stator vane (third-stage stator vane 33) is also lower than the predetermined assumption, the excessive cooling of the inner shroud 122 can be suppressed, and the cooling of the turbine stator vane 100 (third-stage stator vane 33) can be optimized.

REFERENCE SIGNS LIST

1: gas turbine
33: third-stage stator vane (turbine third-stage stator vane)
100: turbine stator vane
110: airfoil portion
110*i*: space
114: through-hole
114*i*: inner impingement hole
114*o*: outer impingement hole
116: internal space (second recessed portion)
117: internal space (first recessed portion)
118: outlet passage
121: outer shroud
121*a*: outer surface
122: inner shroud
122*a*: outer surface
122*c*: end surface
125*c*: end surface
130: impingement plate
171: inner passage
171*o*: outlet end
172: outer passage
172*o*: outlet end
180: thermal barrier coating

The invention claimed is:

1. A turbine stator vane comprising:
an airfoil portion;
an inner shroud that is provided on an inner peripheral side of the airfoil portion; and
an outer shroud that is provided on an outer peripheral side of the airfoil portion,
wherein the inner shroud includes a first recessed portion that is formed on a surface on a side opposite to the airfoil portion by interposing a gas path surface of the inner shroud,
the outer shroud includes a second recessed portion that is formed on a surface on a side opposite to the airfoil portion by interposing a gas path surface of the outer shroud, and at least one outer passage communicating with the second recessed portion and not communicating with a space inside the airfoil portion,
the number of the outer passages is greater than the number of inner passages communicating with the first recessed portion in the inner shroud and not communicating with the space inside the airfoil portion,
a value (Sic/Sig) obtained by dividing a construction area Sic of a thermal barrier coating that is applied to the gas path surface of the inner shroud by an area Sig of the gas path surface of the inner shroud is smaller than a value (Soc/Sog) obtained by dividing a construction area Soc of a thermal barrier coating that is applied to the gas path surface of the outer shroud by an area Sog of the gas path surface of the outer shroud, and
the inner shroud includes an outlet passage communicating with a downstream end of a cooling flow passage located at a most downstream side of the space inside the airfoil portion, wherein the outlet passage does not communicate with the first recessed portion.

2. The turbine stator vane according to claim 1, wherein the turbine stator vane satisfies either of the following conditions (A) or (B), (A) the inner shroud includes one inner passage, and a cross-sectional area Si of an outlet end of the one inner passage is smaller than a total ΣSo of cross-sectional areas So of outlet ends of the at least one outer passage, (B) the inner shroud includes two or more inner passages, and a value (Pi/Di) obtained by dividing an interval Pi between the inner passages by a diameter Di of the inner passage is larger than a value (Po/Do) obtained by dividing an interval Po between the outer passages by a diameter Do of the outer passage.

3. The turbine stator vane according to claim 2, wherein a value (ΣSi/(Sig+Sit)) obtained by dividing a total value ΣSi of the cross-sectional areas Si of the outlet ends of the inner passages by a total value of an area Sig of the gas path surface of the inner shroud and an area Sit of an end surface of the inner shroud on a trailing edge side is smaller than a value (ΣSo/(Sog+Sot)) obtained by dividing a total value ΣSo of the cross-sectional areas So of the outlet ends of the outer passages by a total value of an area Sog of the gas path surface of the outer shroud and an area Sot of an end surface of the outer shroud on a trailing edge side.

4. The turbine stator vane according to claim 2, wherein a value (ΣSi1/Sit) obtained by dividing a total value ΣSi1 of cross-sectional areas Si1 of the outlet ends of the inner passage, which are open to an end surface of the inner shroud on a trailing edge side, of the outlet ends of the inner passage by an area Sit of the end surface of the inner shroud on the trailing edge side is smaller than a value (ΣSo1/Sot) obtained by dividing a total value ΣSo1 of cross-sectional areas So1 of the outlet ends of the outer passage, which are open to an end surface of the outer shroud on a trailing edge side, of the outlet ends of the outer passage by an area Sot of the end surface of the outer shroud on the trailing edge side.

5. The turbine stator vane according to claim 1, wherein an opening density of an inner impingement hole for impingement cooling the inner shroud is smaller than an opening density of an outer impingement hole for impingement cooling the outer shroud.

6. The turbine stator vane according to claim 5, wherein an impingement plate in which the inner impingement hole is formed is not attached to the inner shroud.

7. The turbine stator vane according to claim 1, wherein the thermal barrier coating is not applied to the gas path surface of the inner shroud.

8. The turbine stator vane according to claim 1, wherein the space inside the airfoil portion communicating with the outlet passage is a serpentine channel for cooling the airfoil portion, and the outlet passage includes an inlet opening formed in a wall surface located at a most downstream end, with respect to a flow direction of a cooling medium flowing through the serpentine channel, of wall surfaces defining the serpentine channel.

9. The turbine stator vane according to claim 1, wherein the turbine stator vane is a turbine third-stage stator vane.

10. The turbine stator vane according to claim 1, wherein the inner shroud does not include the inner passage.

11. A turbine stator vane comprising:
an airfoil portion;
an inner shroud that is provided on an inner peripheral side of the airfoil portion; and
an outer shroud that is provided on an outer peripheral side of the airfoil portion,
wherein an opening density of an inner impingement hole for impingement cooling the inner shroud is smaller than an opening density of an outer impingement hole for impingement cooling the outer shroud,
a value (Sic/Sig) obtained by dividing a construction area Sic of a thermal barrier coating that is applied to the gas path surface of the inner shroud by an area Sig of the gas path surface of the inner shroud is smaller than a value (Soc/Sog) obtained by dividing a construction area Soc of a thermal barrier coating that is applied to the gas path surface of the outer shroud by an area Sog of the gas path surface of the outer shroud, and
the inner shroud includes an outlet passage communicating with a downstream end of a cooling flow passage located at a most downstream side of the space inside the airfoil portion, wherein the outlet passage does not communicate with the first recessed portion.

12. The turbine stator vane according to claim 11, wherein the thermal barrier coating is not applied to the gas path surface of the inner shroud.

13. The turbine stator vane according to claim 11, wherein the space inside the airfoil portion communicating with the outlet passage is a serpentine channel for cooling the airfoil portion, and the outlet passage includes an inlet opening formed in a wall surface located at a most downstream end, with respect to a flow direction of a cooling medium flowing through the serpentine channel, of wall surfaces defining the serpentine channel.

* * * * *